US012361712B2

United States Patent
Fu et al.

(10) Patent No.: US 12,361,712 B2
(45) Date of Patent: Jul. 15, 2025

(54) BROWSER-BASED FRAME EXTRACTION METHOD AND SYSTEM

(71) Applicant: SHANGHAI BILIBILI TECHNOLOGY CO., LTD., Shanghai (CN)

(72) Inventors: Qiang Fu, Shanghai (CN); Pengcheng Li, Shanghai (CN); Xiaofeng Ji, Shanghai (CN); Jun Liu, Shanghai (CN)

(73) Assignee: SHANGHAI BILIBILI TECHNOLOGY CO., LTD., Shanghai (CN)

( * ) Notice: Subject to any disclaimer, the term of this patent is extended or adjusted under 35 U.S.C. 154(b) by 217 days.

(21) Appl. No.: 17/924,203

(22) PCT Filed: Dec. 29, 2020

(86) PCT No.: PCT/CN2020/141000
§ 371 (c)(1),
(2) Date: Nov. 9, 2022

(87) PCT Pub. No.: WO2021/227532
PCT Pub. Date: Nov. 18, 2021

(65) Prior Publication Data
US 2023/0186631 A1 Jun. 15, 2023

(30) Foreign Application Priority Data
May 15, 2020 (CN) .......................... 202010414780.X

(51) Int. Cl.
*G06V 20/40* (2022.01)
*G06F 16/24* (2019.01)
(Continued)

(52) U.S. Cl.
CPC ............ *G06V 20/46* (2022.01); *G06F 16/957* (2019.01); *G06V 10/242* (2022.01)

(58) Field of Classification Search
CPC ..... G06V 20/46; G06V 10/242; G06F 16/957
(Continued)

(56) References Cited

U.S. PATENT DOCUMENTS 10,462,237 B1 * 10/2019 Karppanen ........... G06F 16/957
2002/0010709 A1 1/2002 Culbert et al.
(Continued)

FOREIGN PATENT DOCUMENTS

| CN | 104811745 A | 7/2015 |
|---|---|---|
| CN | 105872714 A | 8/2016 |

(Continued)

OTHER PUBLICATIONS

International Patent Application No. PCT/CN2020/141000; Int'l Search Report; dated Mar. 25, 2021; 3 pages.
(Continued)

*Primary Examiner* — Kuen S Lu
(74) *Attorney, Agent, or Firm* — BakerHostetler

(57) ABSTRACT

Embodiments of the present application provide a browser-based frame extraction method. The method includes: monitoring a target operation of a user on a target page of a browser; obtaining a local video file associated with the target operation; and extracting a plurality of target frames from the local video file using a WebAssembly video parser in the browser. This disclosure enables a browser to independently complete operations such as frame extraction on videos in various encoding formats so as to reduce server load.

18 Claims, 8 Drawing Sheets

(51) Int. Cl.
  *G06F 16/957* (2019.01)
  *G06F 40/295* (2020.01)
  *G06V 10/24* (2022.01)
(58) Field of Classification Search
  USPC .......................................................... 382/190
  See application file for complete search history.

(56) References Cited

U.S. PATENT DOCUMENTS

| | | | | |
|---|---|---|---|---|
| 2013/0132462 | A1* | 5/2013 | Moorer | H04N 21/6587 |
| | | | | 709/203 |
| 2016/0007083 | A1* | 1/2016 | Gurha | H04N 21/25808 |
| | | | | 725/13 |
| 2016/0365115 | A1* | 12/2016 | Boliek | G11B 27/105 |
| 2017/0164027 | A1 | 6/2017 | Zhang | |
| 2018/0307723 | A1 | 10/2018 | Bhargava et al. | |
| 2019/0245944 | A1* | 8/2019 | Gorin | G06F 40/146 |
| 2020/0252413 | A1* | 8/2020 | Buzbee | G06F 21/629 |
| 2021/0274246 | A1* | 9/2021 | Lv | H04N 21/4431 |
| 2021/0306397 | A1* | 9/2021 | Nicastri | H04L 65/61 |

FOREIGN PATENT DOCUMENTS

| | | |
|---|---|---|
| CN | 108989609 A | 12/2018 |
| CN | 109511010 A | 3/2019 |
| CN | 110198479 A | 9/2019 |
| CN | 110324706 A | 10/2019 |
| CN | 110362298 A | 10/2019 |
| CN | 110909613 A | 3/2020 |
| CN | 111083569 A | 4/2020 |

OTHER PUBLICATIONS

"What are some WebAssembly applications that stand out?"; https://www.zhihu.com/question/265700379; Dec. 2019; accessed Oct. 26, 2022; 23 pages.

* cited by examiner

BROWSER-BASED FRAME EXTRACTION METHOD AND SYSTEM

CROSS-REFERENCE TO RELATED APPLICATIONS

The present application is the U.S. National Stage of International Application No. PCT/CN2020/141000, filed on Dec. 29, 2020, which claims priority to Chinese Patent Application No. 202010414780.X, entitled "BROWSER-BASED FRAME EXTRACTION METHOD AND SYSTEM", filed on May 15, 2020, the disclosures of which are incorporated herein by reference in their entireties.

TECHNICAL FIELD

Embodiments of the present application relate to the field of browser technologies, and in particular, to a browser-based frame extraction method and system, a computer device, and a computer-readable storage medium.

BACKGROUND

With the development of Internet technology, Youtube, Bilibili, and other online platforms have gradually developed a content production mode in the form of user generated content (UGC). The core of UGC is to encourage each user to display original content (for example, video files) through an Internet platform or provide such content to other users. UGC allows everyone to be a content generator, and therefore massive videos can be quickly produced to enrich people's spiritual life. However, each user's video files also tend to be submerged in such massive videos. Therefore, when posting a video file, a user usually sets a video cover for the video file to be posted, so that other users can more intuitively acquire content in the video file, thereby increasing a click-through rate.

SUMMARY OF THE INVENTION

An objective of the embodiments of the present application is to provide a browser-based frame extraction method and system, a computer device, and a computer-readable storage medium, to resolve the problem that an existing browser cannot perform a "frame extraction" operation on videos of various different encoding formats on the market as well as the problem of severe consumption of server resources caused by this problem.

An aspect of the embodiments of the present application provides a browser-based frame extraction method, including: monitoring a target operation of a user on a target page of a browser; obtaining a local video file associated with the target operation; and extracting a plurality of target frames from the local video file by using a WebAssembly video parser in the browser.

Optionally, the extracting a plurality of target frames from the local video file by using a WebAssembly video parser in the browser further includes: determining, by using the WebAssembly video parser, whether the local video file is in a portrait orientation; extracting a plurality of frames from the local video file by using the WebAssembly video parser; performing image rotation on each of the plurality of frames to obtain frames in the portrait orientation if the local video file is in the portrait orientation; and determining the frames in the portrait orientation as corresponding target frames.

Optionally, the extracting a plurality of frames from the local video file by using the WebAssembly video parser includes: obtaining N frames corresponding to N time nodes, including: obtaining a key frame closest to a time node M, and determining the key frame as a frame corresponding to the time node M, where 1≤M≤N.

Optionally, the method further includes: configuring, according to the N time nodes and a frame size of each frame, a memory area for accommodating the N frames.

Optionally, the method further includes: monitoring whether the browser goes to the target page; and initializing a main thread and creating a frame extraction thread in response to that the browser goes to the target page, the frame extraction thread being used for loading the WebAssembly video parser.

Optionally, the extracting a plurality of target frames from the local video file by using a WebAssembly video parser in the browser includes: running the WebAssembly video parser by using the frame extraction thread to extract the plurality of target frames from the local video file; and transferring the plurality of target frames into the main thread for the main thread to perform a corresponding operation on the plurality of target frames.

Optionally, the method further includes: performing a detection operation on the local video file, and determining, according to a detection result, whether to extract the plurality of target frames from the local video file, where the detection operation is used for detecting whether the local video file is a corrupted file, whether the local video file includes a video stream, and/or whether a video format of the video stream is supported by the WebAssembly video parser.

An aspect of the embodiments of the present application further provides a browser-based frame extraction system, including: a monitoring module, configured to monitor a target operation of a user on a target page of a browser; an obtaining module, configured to obtain a local video file associated with the target operation; and an extraction module, configured to extract a plurality of target frames from the local video file by using a WebAssembly video parser in the browser.

An aspect of the embodiments of the present application further provides a computer device, including a memory, a processor, and a computer-readable instruction stored in the memory and executable on the processor, where the processor executes the computer-readable instruction to implement the following steps: monitoring a target operation of a user on a target page of a browser; obtaining a local video file associated with the target operation; and extracting a plurality of target frames from the local video file by using a WebAssembly video parser in the browser.

An aspect of the embodiments of the present application further provides a computer-readable storage medium, including a memory, a processor, and a computer-readable instruction stored in the memory and executable on the processor, where the processor executes the computer-readable instruction to implement the following steps: monitoring a target operation of a user on a target page of a browser; obtaining a local video file associated with the target operation; and extracting a plurality of target frames from the local video file by using a WebAssembly video parser in the browser.

In the browser-based frame extraction method and system, the computer device, and the computer-readable storage medium provided in the embodiments of the present application, a WebAssembly technology is adopted. A plurality of target frames may be extracted from the local video file by using a WebAssembly video parser in the browser. That is, this disclosure enables a browser to independently complete operations such as frame extraction on videos in various encoding formats so as to reduce server load.

DETAILED DESCRIPTION

Figure 1:
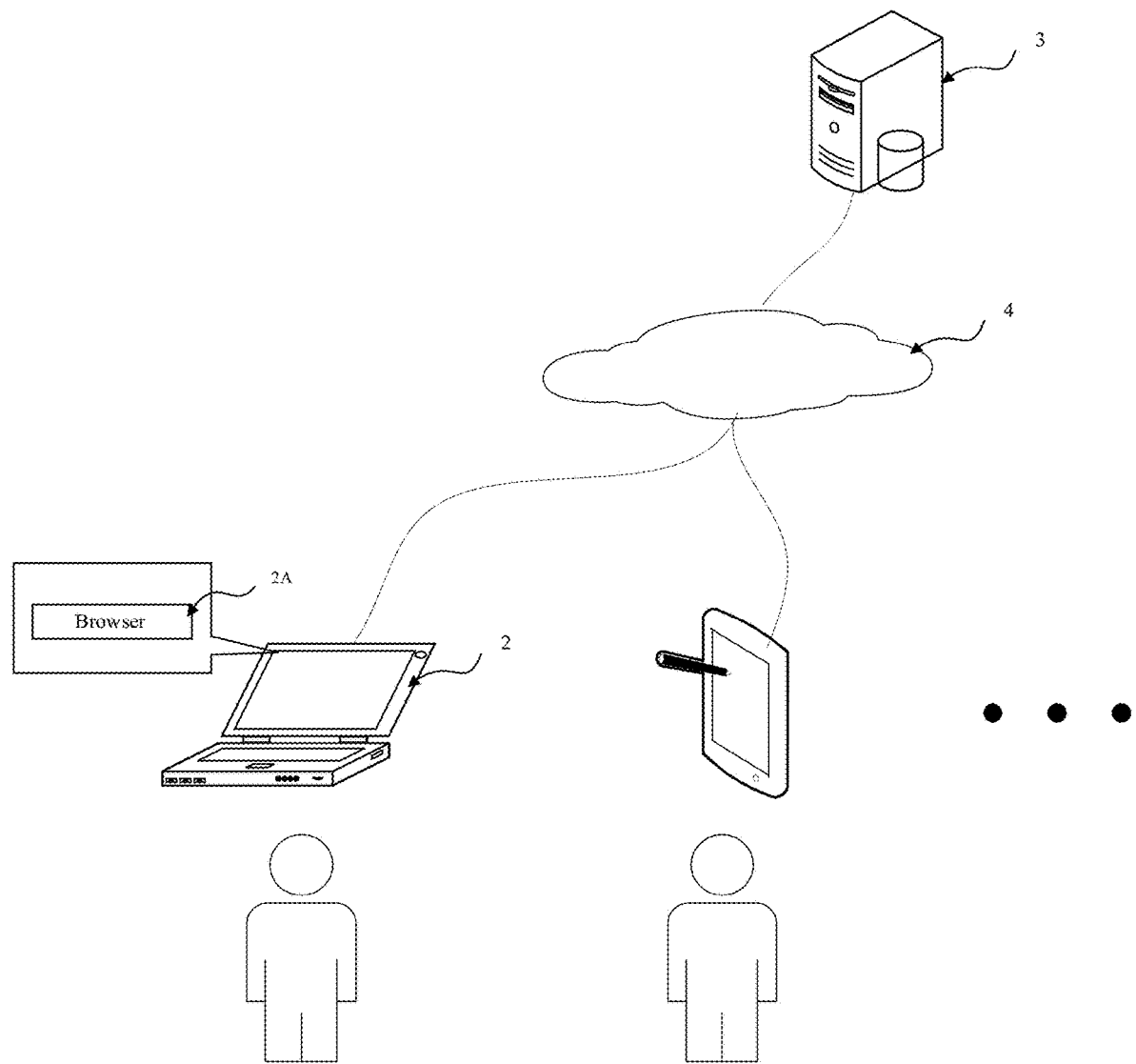
FIG. 1 is a schematic diagram of a running environment of a browser-based frame extraction method according to an embodiment of the present application.

To make the objectives, technical solutions, and advantages of the present application more comprehensible, the present application is further described below in detail with reference to the accompanying drawings and embodiments. It should be understood that the specific embodiments described herein are merely used to describe the present application rather than limiting the present application. All other embodiments obtained by those of ordinary skill in the art based on the embodiments of the present application without creative efforts fall within the protection scope of the present application.

It needs to be noted that in the embodiments of the present application, description of "first", "second", and the like are used only for description, but are not intended to indicate or imply relative importance or implicitly specify a quantity of indicated technical features. Therefore, the features limited by "first" and "second" may explicitly or implicitly include at least one such feature. In addition, the technical solutions between the various embodiments can be combined with each other provided that such combination can be implemented by those of ordinary skill in the art. When a combination of technical solutions encounters a contradiction or cannot be implemented, it should be considered that this combination of technical solutions does not exist and does not fall within the protection scope claimed in the present application.

The following are terminological explanations of some terms that may be involved in the present application.

ffmpeg is written in the C language and may run functions such as recording, parsing, conversion, and streaming of various formats of audio and videos.

Libjpeg is a free library that is written in the C language and is used for processing a JPEG image data format.

Emcc is used for compiling a file into LLVM bytecode.

JavaScript/JS is a script language run in a browser.

WebAssembly/wasm is a binary instruction format of a stack-based virtual machine, and is run in a sandbox execution environment in a browser. WebAssembly/wasm is designed as a portable target of a high-level language such as C/C++/Rust and may deploy a client application and a server application on a Web.

asm.js may resolve the problem of execution efficiency of a JS engine, especially the efficiency of compilation from C/C++ language into a JS program using Emscripten. In the present application, asm.js is used as a backstop solution for a browser that does not support the WebAssembly technology.

A low level virtual machine (LLVM) is a compiler infrastructure that is written in C++, includes a series of modular compiler components and toolchains, and is used for developing a front end and a back end of a compiler. LLVM bytecode is intermediate code that has been compiled but is not related to specific machine code and needs to be translated using an LLVM interpreter to become machine code.

Emscripten is an LLVM-based asm.js&WebAssembly compilation toolchain. In the present application, Emscripten may compile ffmpeg related code generated in C language into asm.js&WebAssembly.

A picture evaluation model may be a TensorFlow-based deep learning framework. TensorFlow is an end-to-end open-source software library used for machine learning, and may be used for a machine learning application, for example, a deep neural network.

Frame extraction is extracting one or more frames from a video file.

Picture evaluation is used for evaluating whether each frame is suitable for use as a video cover of a video file.

The problem to be resolved by the present application is described below.

A procedure of a setting video cover is usually as follows: determining which frames in a corresponding video file are suitable for use as a video cover; and recommending some frames suitable for use as a video cover to a user to allow the user to select one frame from the frames for use as a video cover. The step of determining which frames are suitable for use as a video cover involves "frame extraction" and other operations.

The "frame extraction" operation may be implemented in a browser and a server. However, there are the following problems:

(1) Current browsers cannot support a "frame extraction" operation on video files of various different encoding formats on the market.

(2) When the server is used to perform a "frame extraction" operation, there is severe consumption of server resources.

When a user uses a browser to publish a video file on a network platform, a video cover is usually set for the video file published by the user, so that other users can more intuitively acquire content in the video file, thereby increasing a click-through rate. In a process of setting the video cover for the video file, "frame extraction", "picture evaluation", and other steps are required. The "frame extraction" is to extract pictures from the video file by using an ffmpeg technology according to the time of picture extraction. The "picture evaluation" is to perform picture evaluation on every frame extracted from the video file to evaluate whether these frames are suitable for use as the video cover of the video file. In the prior art, the "frame extraction" operation mainly includes the following two implementations. First, a video file is uploaded to a server. After the video file has been uploaded, the server runs an ffmpeg command to extract every frame from the video file. Second, a canvas of a web end is used to embed a video tag, the video file is played in a scenario invisible to a user, and a screen capture operation is implemented. However, this technology supports only a few video encoding formats (depending on the support status of a browser) and cannot cover most video formats on the market. In the prior art, the "picture evaluation" operation is mainly implemented by using the following procedure: A picture evaluation model is first run on the server to perform a picture evaluation operation on each frame extracted by the server. Some frames are selected according to an evaluation result and fed back to the browser for the user to select one frame from these frames as the video cover of the video file. Therefore, a procedure of setting a video cover in the prior art is as follows: The user uploads the video file through the browser→the video file is completely uploaded to the server→the server performs frame extraction on the video file→the server performs picture evaluation on each frame→the server selects some frames according to an evaluation result and feeds back the frames to the browser for the user to select one frame from these frames as the video cover of the video file. A major problem of the prior art lies in that it takes an excessive time to generate a recommended cover and it is required to wait for processing results of a plurality of steps such as uploading, frame extraction, and picture evaluation of the server. As a result, when some users submit a post, a recommended cover fails to be generated in time, and there is also severe consumption of server resources.

A plurality of embodiments are provided below, and it is not difficult to understand that the individual embodiments provided below can be used to resolve at least some of the problems described above.

FIG. 1 is a schematic diagram of a running environment of a browser-based cover generation method according to Embodiment 1 of the present application. In an exemplary embodiment, a computer device 2 may be connected to a content publishing platform 3 by a network 4, and publishes content through the content publishing platform 3. The content may include a local video file and the like in the computer device 2.

The computer device 2 may be configured to access the content publishing platform 3 through a browser 2A and may upload the local video file to the content publishing platform 3 through the browser 2A to publish the video file of the computer device 2 on the content publishing platform 3. The computer device 2 may include any type of computing device such as a mobile device, a tablet device, and a laptop computer.

The content publishing platform 3 may be formed by a plurality of servers and is used for providing the computer device 2 with a video file publishing service. The plurality of servers may include a virtualized computing instance. The virtualized computing instance may include a virtual machine such as a simulation of a computer system, an operating system, and a server. The server may load a virtual machine based on a virtual image and/or other data of specific software (for example, an operating system, a dedicated application, and a server) defined for simulation. As the demand for processing services of different types changes, different virtual machines may be loaded and/or terminated on one or more servers. A management program may be implemented to manage the use of different virtual machines on one same server.

The network 4 may include various network devices such as a router, a switch, a multiplexer, a hub, a modem, a bridge, a repeater, a firewall, a proxy device, and/or the like. The network 4 may include a physical link such as a coaxial cable link, a twisted pair cable link, a fiber optic link, a combination thereof, and/or the like. The network 4 may include a wireless link such as a cellular link, a satellite link, a Wi-Fi link, and/or the like.

Embodiment 1

Figure 2:
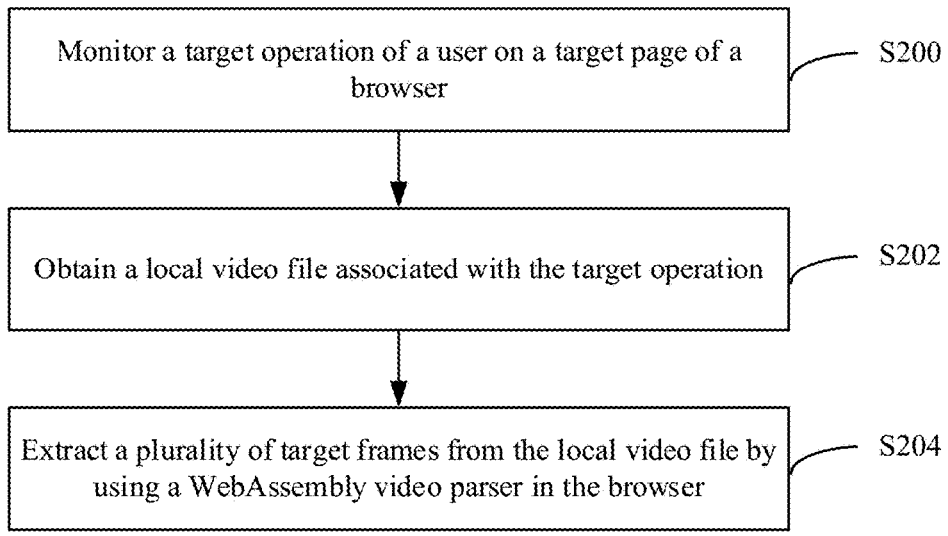
FIG. 2 is a schematic flowchart of a browser-based frame extraction method according to Embodiment 1 of the present application.

FIG. 2 is a schematic flowchart of a browser-based frame extraction method according to Embodiment 1 of the present application. It may be understood that the flowchart in the method embodiment is not used to limit an order in which steps are performed. An example in which the computer device 2 is an execution body is used for description below.

As shown in FIG. 2, the browser-based frame extraction method may include steps S200 to S204.

Step S200: Monitor a target operation of a user on a target page of a browser 2A.

Step S202: Obtain a local video file associated with the target operation.

Step S204: Extract a plurality of target frames from the local video file by using a WebAssembly video parser in the browser 2A.

In an exemplary embodiment, the target operation may be an upload operation.

Figure 3:
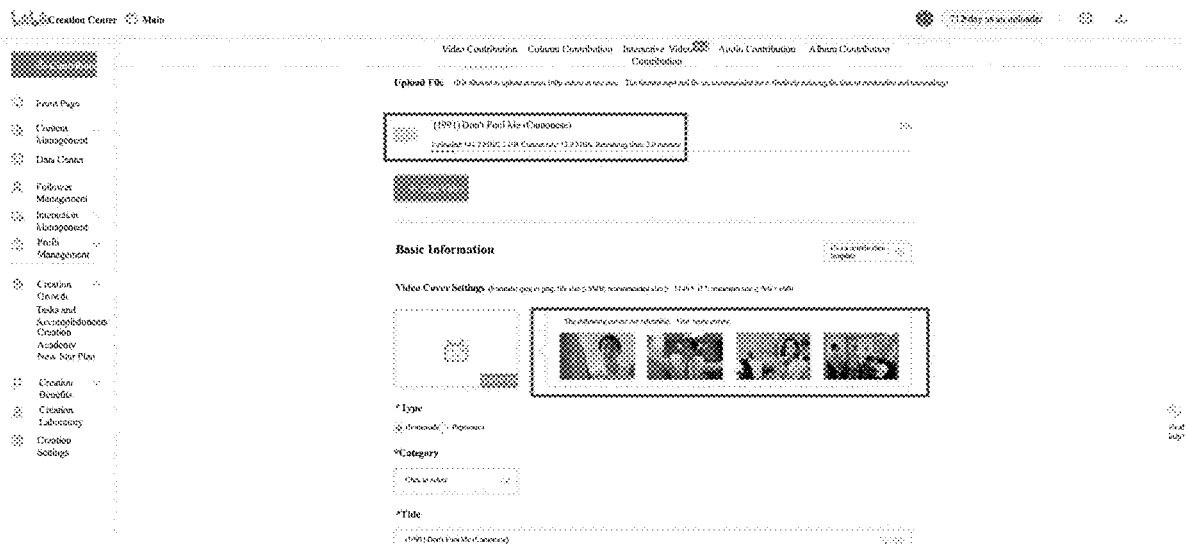
FIG. 3 is a schematic diagram of a target page.

As shown in FIG. 3, if the computer device 2 detects a click operation on an upload button, it indicates that an upload operation based on the target page is detected. The upload operation is to upload a local video file "(1991) Don't Fool Me (Cantonese)" to the content publishing platform 3, to publish the local video file through the content publishing platform 3.

Figure 4:
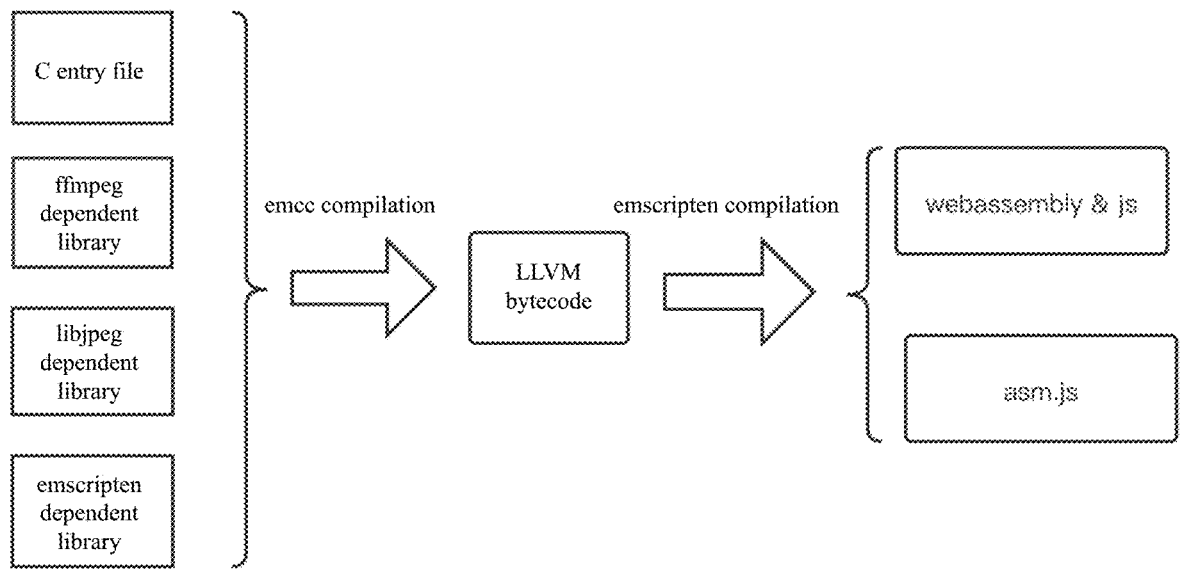
FIG. 4 is a schematic flowchart of compilation of a WebAssembly video parser.

As shown in FIG. 4, a compilation process of the WebAssembly video parser may be as follows: (1) preparing a C entry file, an ffmpeg dependent library, a libjpeg dependent library, and an emscripten dependent library; (2) compiling the files in (1) by using emcc to obtain LLVM bytecode; and (3) compiling the LLVM bytecode by using Emscripten to obtain WebAssembly and asm.js. With WebAssembly and asm.js, ffmpeg may be applicable to a browser and can provide a browser-based frame extraction service. Because asm.js is a degraded solution of WebAssembly, in the present application, WebAssembly and asm.js are collectively referred to as the WebAssembly video parser. In this embodiment, based on the WebAssembly technology, through compilation of c language source code of ffmpeg and autonomous implementation, the browser 2A can obtain the capability provided by ffmpeg. That is, the browser 2A can independently perform a frame extraction operation.

Figure 5:
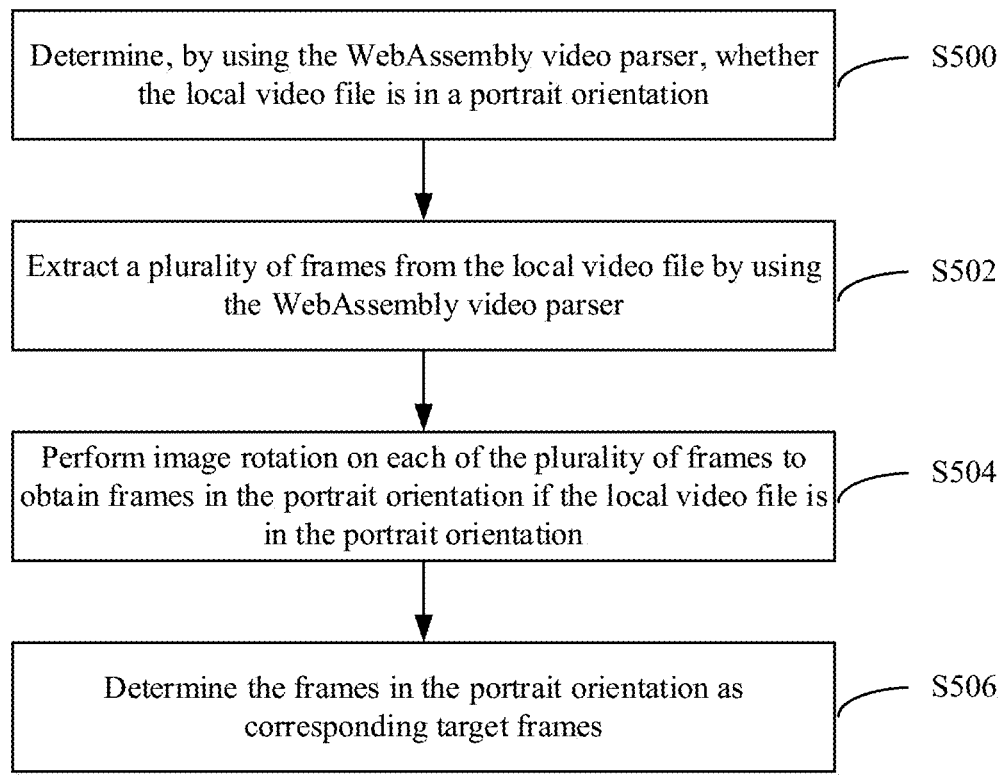
FIG. 5 is a schematic sub-flowchart of step S204 in FIG. 1.

In an exemplary embodiment, to ensure that target frames can be accurately displayed and ensure that the target frames can be accurately recognized and evaluated in a picture evaluation model, as shown in FIG. 5, step S204 may include steps S500 to S506. Step S500: Determine, by using the WebAssembly video parser, whether the local video file is in a portrait orientation. Step S502: Extract a plurality of frames from the local video file by using the WebAssembly video parser. Step S504: Perform image rotation on each of the plurality of frames to obtain frames in the portrait orientation if the local video file is in the portrait orientation. Step S506: Determine the frames in the portrait orientation as corresponding target frames. It needs to be noted that if the local video file is in a landscape orientation, in a case that a rotation operation does not need to be performed, each of the plurality of frames is directly determined as a corresponding target frame. In an example, if a local video file Y is obtained through photographing when a mobile phone X is in a portrait state, the local video file Y is a portrait file. When parsing a portrait file, the WebAssembly video parser converts the portrait file into a landscape file. The foregoing operation may lead to such a problem: Frames extracted from a portrait file are in a landscape orientation, making a display orientation of these frames different from a display orientation of the local video file Y. As a result, these frames cannot be accurately displayed and are unusable in the picture evaluation model. To resolve the foregoing problem, the browser 2A may parse the local video file Y by using the WebAssembly video parser to obtain rotation information written in the local video file Y when the mobile phone X photographs the local video file Y, and acquire through the rotation information whether the local video file Y is a portrait file or a landscape file. If the local video file Y is a portrait file, the browser 2A uses the WebAssembly video parser to perform a rotation operation on a plurality of frames extracted from the local video file Y, so that a display orientation of the plurality of frames after the rotation operation is kept consistent with the display orientation of the local video file Y.

Figure 6:
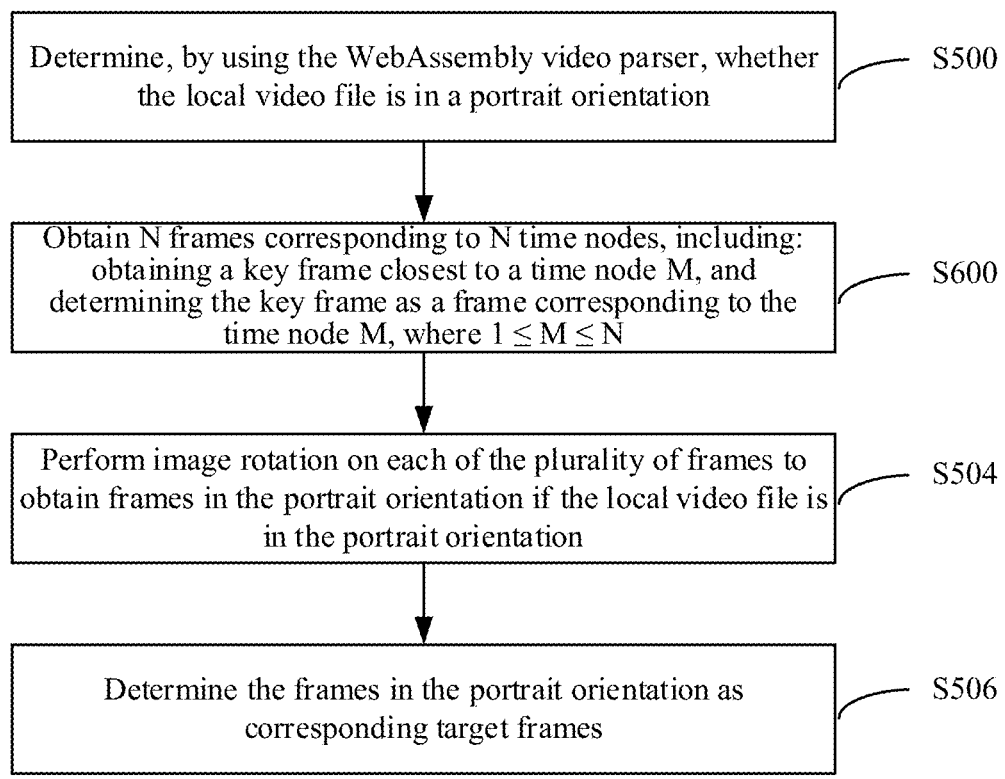
FIG. 6 is another schematic sub-flowchart of step S204 in FIG. 1.

In an exemplary embodiment, as shown in FIG. 6, to reduce the consumption of computing resources of the computer device 2 and at the same time ensure that a plurality of frames extracted from the local video file are of high quality and most representative, step S502 may be implemented by using the following steps: Step S600: Obtain N frames corresponding to N time nodes, including: obtaining a key frame closest to a time node M, and determining the key frame as a frame corresponding to the time node M, where 1≤M≤N. M and N are both positive integers. M is an independent variable. N may be a preset value or may be a dynamic value that can be adjusted according to a current workload of the computer device 2. For example, when the computer device 2 is in a heavy load state, N may be dynamically adjusted to be one time node every 10 seconds. When the computer device 2 is in an idle state, N may be dynamically adjusted to be one time node every 5 seconds. For example, the N time nodes include: the first time node (corresponding to 00:00 on a progress bar of the local video file), the second time node (corresponding to 00:05 on the progress bar of the local video file), the third time node (corresponding to 00:15 on the progress bar of the local video file), the fourth time node (corresponding to 00:20 on the progress bar of the local video file), the fifth time node (corresponding to 00:25 on the progress bar of the local video file), and . . . . The browser 2A may use the WebAssembly video parser to parse frame information (an I frame, a P frame, and a B frame) of frames in the local video file and then may perform the following operations: finding an I frame closest to the first time node according to the frame information of the frames, and using the I frame closest to the first time node as a key frame of the first time node; and finding an I frame closest to the second time node according to the frame information of the frames, and using the I frame closest to the second time node as a key frame of the second time node; and so on. It needs to be noted that the I frame is also referred to as an intra picture.

In the prior art, a server needs to start to implement frame extraction and other operations after the local video file has been uploaded. Therefore, when a local video is relatively large, in the prior art, it takes an excessively long time to generate a cover, and server resources are consumed.

Compared with the prior art, the browser-based frame extraction method in this embodiment uses a WebAssembly technology. In this embodiment, the WebAssembly video parser is loaded and run by using a frame extraction thread. A browser can independently complete a frame extraction operation on videos of various different encoding formats to extract a plurality of target frames from the local video file, but it is not necessary to upload the local video file to the server (for example, the content publishing platform 3) and extract and return a plurality of target frames by using the server. That is, this embodiment can enable a browser to independently complete an operation such as frame extraction on videos of various different encoding formats, reducing server load. In addition, the browser may simultaneously perform an upload procedure of a local video file and perform a frame extraction procedure of the local video file, thereby greatly reducing the time for generating a cover when a user submits a post. Generally, a completion time for generating a cover of a local video file is shorter than a completion time of an upload procedure of the local video file. The browser-based frame extraction method in this embodiment includes, but is not limited to, supporting the following video encoding formats: a Moving Picture Experts Group (MPEG) series, a Windows Media Video (WMV) series, flash video (FLV), Microsoft Video 1 (msvideo1, an AVI codec provided by Microsoft), mss2, H264 (that is, a new generation digital video compression format after MPEG4 jointly proposed by the International Organization for Standardization and the International Telecommunication Union), High Efficiency Video Coding (HEVC), H263 (that is, a low bit rate video coding standard for videoconferencing developed by the ITU-T), RV40 (RealVideo 9, a coding format based on the H.264 draft), RV20 (RealVideo G2 or RealVideo G2+SVT), Digital Video Format (dv-video), rawvideo (a video format without any post-processing or modification), v210 (that is, a UYVY format), a TechSmith Screen Capture Codec (TSCC, a video codec developed by TechSmith) series, ProPes (that is, a lossy compression film compression technology developed by Apple), vp6f, Portable Network Graphics (PNG), Motion Joint Photographic Experts Group (MJPEG, that is, a motion still image (or frame-by-frame compression technology)), Graphics Interchange Format (GIF), a VP series (that is, an open-format, royalty-free video compression standard developed by Google), and Theora (that is, a lossy image compression technology developed by the Xiph.org Foundation).

Embodiment 2

Figure 7:
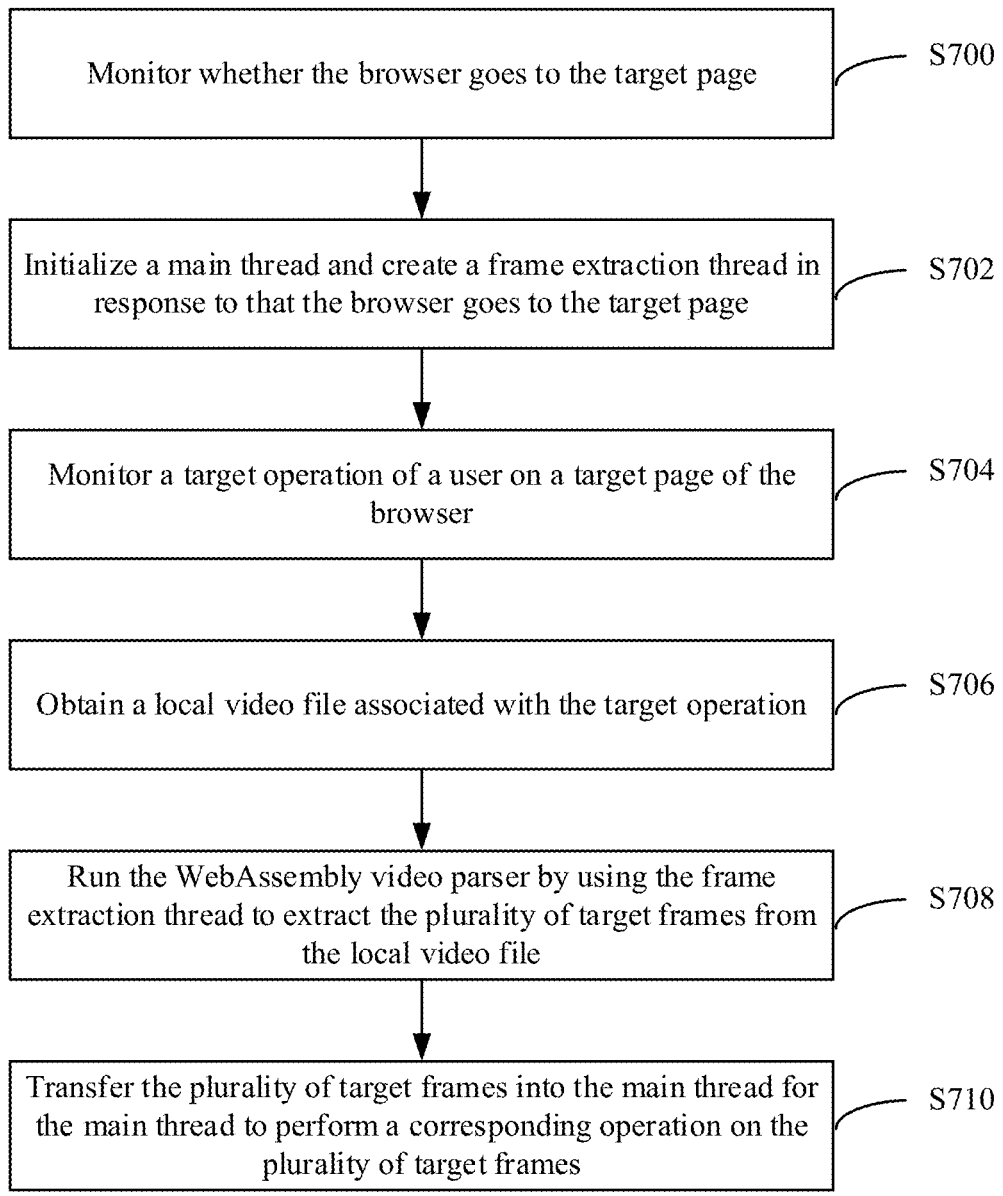
FIG. 7 is a schematic flowchart of a browser-based frame extraction method according to Embodiment 2 of the present application.

FIG. 7 is a schematic flowchart of a browser-based frame extraction method according to Embodiment 2 of the present application. An example in which the computer device 2 is the execution body is used for description below. As shown in FIG. 7, the browser-based frame extraction method may include steps S700 to S710.

Step S700: Monitor whether the browser 2A goes to the target page.

Each tab in the browser 2A corresponds to one independent process. Each process corresponds to one or more threads. The browser 2A goes to the target page, indicating that the browser 2A has opened a new tab. As shown in FIG. 3, in an exemplary embodiment, the target page may be a submission page for providing an interface portal for a user to upload a local video file to the content publishing platform 3.

Step S702: Initialize a main thread and create a frame extraction thread in response to that the browser 2A goes to the target page.

The target page may be associated with a plurality of threads. One of the plurality of threads is the main thread. The main thread may be responsible for operations such as rendering, display, and page interaction of the target page. In this embodiment, a new frame extraction thread is additionally created, so that frame extraction and other operations do not need to be implemented in the main thread, thereby ensuring that rendering, display, page interaction, and other operations in the main thread are not susceptible to frame extraction, picture evaluation, and other operations.

The frame extraction thread is used for loading the WebAssembly video parser.

Step S704: Monitor a target operation of a user on the target page of the browser 2A.

As shown in FIG. 3, if the computer device 2 detects a click operation on an upload button, it indicates that a target operation based on the target page is detected. The target operation is to upload a local video file "(1991) Don't Fool Me (Cantonese)" to the content publishing platform 3, to publish the local video file through the content publishing platform 3.

Step S706: Obtain a local video file associated with the target operation.

Step S708: Run the WebAssembly video parser by using the frame extraction thread to extract the plurality of target frames from the local video file.

Step S710: Transfer the plurality of target frames into the main thread for the main thread to perform a corresponding operation on the plurality of target frames.

The main thread may perform the following operations: selecting some candidate frames from the plurality of target frames; presenting these candidate frames to the target page; selecting one candidate frame from these candidate frames according to a user instruction; and generating a video cover according to the selected candidate frame. The video cover is associated with the local video file and is provided to a server (for example, the content publishing platform 3).

In an exemplary embodiment, the frame extraction thread transfers the plurality of target frames to the main thread. The main thread obtains the plurality of target frames provided by the frame extraction thread, and transmits image data of the plurality of target frames or image data of the plurality of target frames after format conversion to a picture evaluation thread. The picture evaluation thread is in the target page and is used for loading and running a trained picture evaluation model. The picture evaluation thread runs the picture evaluation model, and inputs the image data of the plurality of target frames or the image data of the plurality of target frames after format conversion into the picture evaluation model, to output picture evaluation parameters of the target frames by using the picture evaluation model. The picture evaluation thread transfers the picture evaluation parameters (for example, scores) of the target frames to the main thread. After obtaining the picture evaluation parameters of the target frames, the main thread may sort the plurality of target frames according to the picture evaluation parameters of the target frames, select some target frames ranking higher as candidate frames, and display these candidate frames in the target page in a particular order, as shown in FIG. 3.

The picture evaluation model may be a deep neural network model or another model.

In an exemplary embodiment, the picture evaluation model includes a feature extraction layer, a first fully connected layer, and a second fully connected layer. The feature extraction layer may be formed by one or more convolutional layers and is used for extracting image features of the target frames by using a convolution operation. It needs to be noted that the first fully connected layer and the second fully connected layer have a parallel relationship, and the first fully connected layer and the second fully connected layer share the feature extraction layer. The first fully connected layer is used for scenario recognition, and the second fully connected layer is used for image quality evaluation. Compared with the prior art in which a scenario recognition model and an image quality evaluation model are separately disposed, in this embodiment, scenario recognition and image quality evaluation are implemented using one picture evaluation model, and the computing amount is effectively reduced through sharing of a feature extraction layer.

In this embodiment, a TensorFlow-JavaScript technology is used. A picture evaluation model that is originally run on a server is packaged in a format that can be run on a browser and is distributed to the browser, so that the browser may locally run the picture evaluation model to complete picture evaluation of a target frame, thereby avoiding a wait time of the server. Specifically, the picture evaluation thread runs the picture evaluation model to perform the following operations: (1) extracting an image feature of a target frame M by using the picture evaluation model, where $1 \leq M \leq N$, and N is a quantity of the plurality of target frames; (2) obtaining confidence levels of the target frame M corresponding to scenario classes according to the image feature of the target frame M and the first fully connected layer of the picture evaluation model; (3) obtaining an image quality evaluation value of the target frame M according to the image feature of the target frame M and the second fully connected layer of the picture evaluation model; (4) obtaining a picture evaluation parameter corresponding to the target frame M according to the confidence levels of the target frame M corresponding to the scenario classes and the image quality evaluation value of the target frame M; and repeating steps (1) to (4) until the plurality of target frames have all been evaluated.

In an exemplary embodiment, the scenario class may be as follows: "Animation Comic Game (ACG, Anime)", "ACG_Object (Anime Object)", "Animal", "Food", "Game", "Multi-Person", "Object", "Person", "Scenery", "Text", and "Other". A range of the image quality evaluation value is 0 to 1, and is affected by brightness, saturation, and the like. If an image quality evaluation value of a target frame is closer to 1, it indicates that the target frame has higher picture quality.

In an exemplary embodiment, the picture evaluation parameter P of the target frame M is obtained by using the following formula:

$$P = p2 \Sigma_i W_{i, arg\ max\ p1} p1_i,$$

where $p1_i$ represents a confidence level of the target frame M corresponding to an $i^{th}$ scenario, p2 represents an image quality evaluation value of the target frame M, arg max p1 represents a target scenario with the highest confidence level, and $W_{i, arg\ max\ p1}$ represents an association degree weight between the target scenario corresponding to the target frame M and the $i^{th}$ scenario.

arg max p1 represents the target scenario with the highest confidence level. When the first fully connected layer obtains that a scenario class of a target frame Z is "Person", the following needs to be considered: In a case that it is recognized that the scenario class of the target frame Z is "Person", there is a possibility that the scenario class of the target frame Z is "Multi-Person" or even a possibility that the scenario class of the target frame Z is "Scenery". To resolve the foregoing problem, it may be known from $\Sigma_i W_{i,\text{arg max } p1} p1_i$ that this embodiment provides a plurality of a priori weight values (that is, the association degree weight), for example: (1) a priori weight value (that is, $W_{i,\text{arg max } p1}$ corresponding to i=arg max p1) of the scenario class of the target frame Z being "Person" in a case that the scenario class of the target frame Z is "Person"; (2) a priori weight value (that is, an association degree weight between "Person" and "Multi-Person") of the scenario class of the target frame Z being simultaneously "Multi-Person" in a case that the scenario class of the target frame Z is "Person"; (3) a priori weight value (that is, an association degree weight between "Person" and "ACG") of the scenario class of the target frame Z being simultaneously "ACG" in a case that the scenario class of the target frame Z is "Person"; (4) a priori weight value (that is, an association degree weight between "Person" and "ACG_Object") of the scenario class of the target frame Z being simultaneously "ACG_Object" in a case that the scenario class of the target frame Z is "Person"; and ... $\Sigma_i W_{i,\text{arg max } p1} p1_i$ effectively suppresses a substantial evaluation error caused by a scenario classification error.

Step S206C: The main thread obtains the picture evaluation parameters of the target frames provided by the picture evaluation thread, selects one or more candidate frames from the plurality of target frames according to the picture evaluation parameters of the target frames, and generates, according to the one or more candidate frames, the video cover used for representing the local video file.

In the browser-based frame extraction method in this embodiment, two independent and collaborative threads (that is, a main thread and a frame extraction thread) are provided in the target page, so that frame extraction and other operations do not need to be implemented in the main thread, thereby ensuring that rendering, display, page interaction, and other operations in the main thread are not susceptible to frame extraction and other operations, that is, ensuring the smoothness of the main thread.

Figure 8:
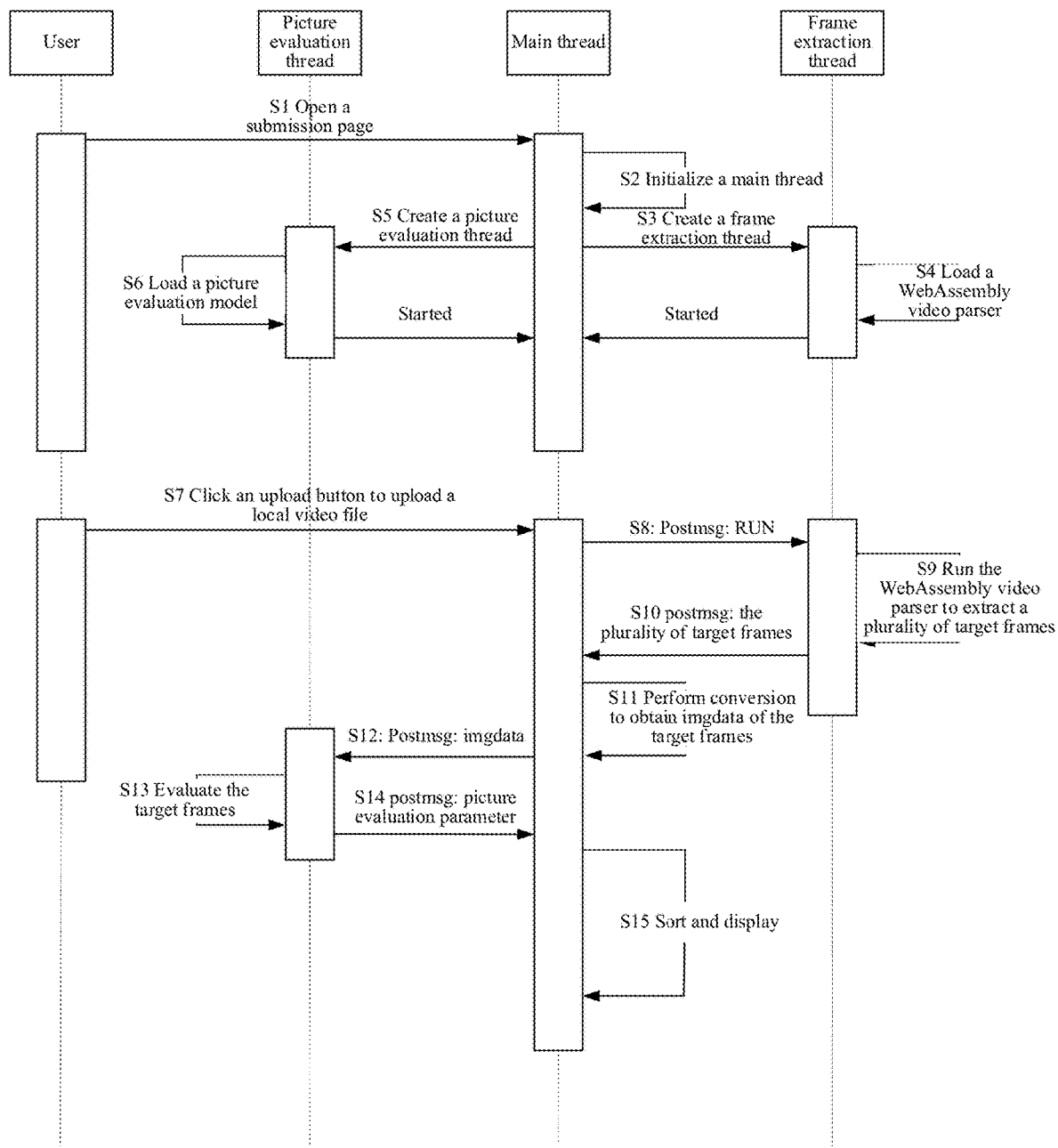
FIG. 8 is an exemplary schematic flowchart of generating a video cover.

To make the present application clearer and more comprehensible, an exemplary procedure for generating a video cover is provided below. As shown in FIG. 8:

S1: Open a submission page according to a user instruction.

S2: Initialize a main thread.

S3: Create a frame extraction thread.

S4: Load a WebAssembly video parser in the frame extraction thread.

S5: Create a picture evaluation thread.

S6: Load a picture evaluation model (for example, tensorflow.js) in the picture evaluation thread.

S7: A user clicks an upload button to upload a local video file.

S8: The main thread instructs the frame extraction thread to enter a running state (postmsg: RUN).

S9: Run the WebAssembly video parser to extract a plurality of target frames.

S10: The frame extraction thread transfers the plurality of target frames to the main thread (postmsg: the plurality of target frames).

S11: Perform conversion to obtain imgdata of the target frames. The main thread performs format conversion on image data of the target frames to obtain a data format that can be recognized by the picture evaluation model. imgdata is image data in a data format that can be recognized by the picture evaluation model. It needs to be noted that the step may be performed in the picture evaluation thread. This is not limited in the present application.

S12: The main thread transfers imgdata to the picture evaluation thread (postmsg: imgdata).

S13: The picture evaluation thread evaluates the target frames by using the picture evaluation model. The picture evaluation thread is to input imgdata of the frames into the picture evaluation model, so that the picture evaluation model obtains picture evaluation parameters of the target frames.

S14: The picture evaluation thread transfers the picture evaluation parameters of the target frames to the main thread (postmsg: the picture evaluation parameters).

S15: The main thread performs the following operations: sorting the plurality of target frames according to the picture evaluation parameters of the target frames, and selecting some target frames ranking higher as candidate frames, and display these candidate frames in the target page in a particular order, for selection by the user.

For example, if a user needs to publish a local video file on the Bilibili platform, the user may open the Bilibili submission page in a browser and click the upload button "Submit". After the upload button is triggered, the browser concurrently performs the following operations: (1) uploading the local video file to the Bilibili platform; and (2) obtaining and presenting candidate frames for a video cover by using local computing resources, for selection by the user.

Tests show that by means of the foregoing cover generation method, both a cover display rate and a completion rate are improved, and a cover generation time is significantly reduced.

Cover display rate: When users submit posts, a comprehensive display rate of recommended covers is increased from approximately 60% to over 75%.

Completion rate: The generation of video covers may be completed for approximately 50% of submission users after a single submission is completed.

Running time: It is obtained through tests of a large number of samples that video covers can be generated within 10 seconds for approximately 50% of test samples, video covers can be generated within 20 seconds for approximately 80% of test samples, and video covers can be generated within 30 seconds for approximately 98% of test samples. The running time in the prior art depends on a plurality of dimensionalities such as a contribution size, a network transmission rate, and server running pressure. The completion time is long and very unstable.

Figure 9:
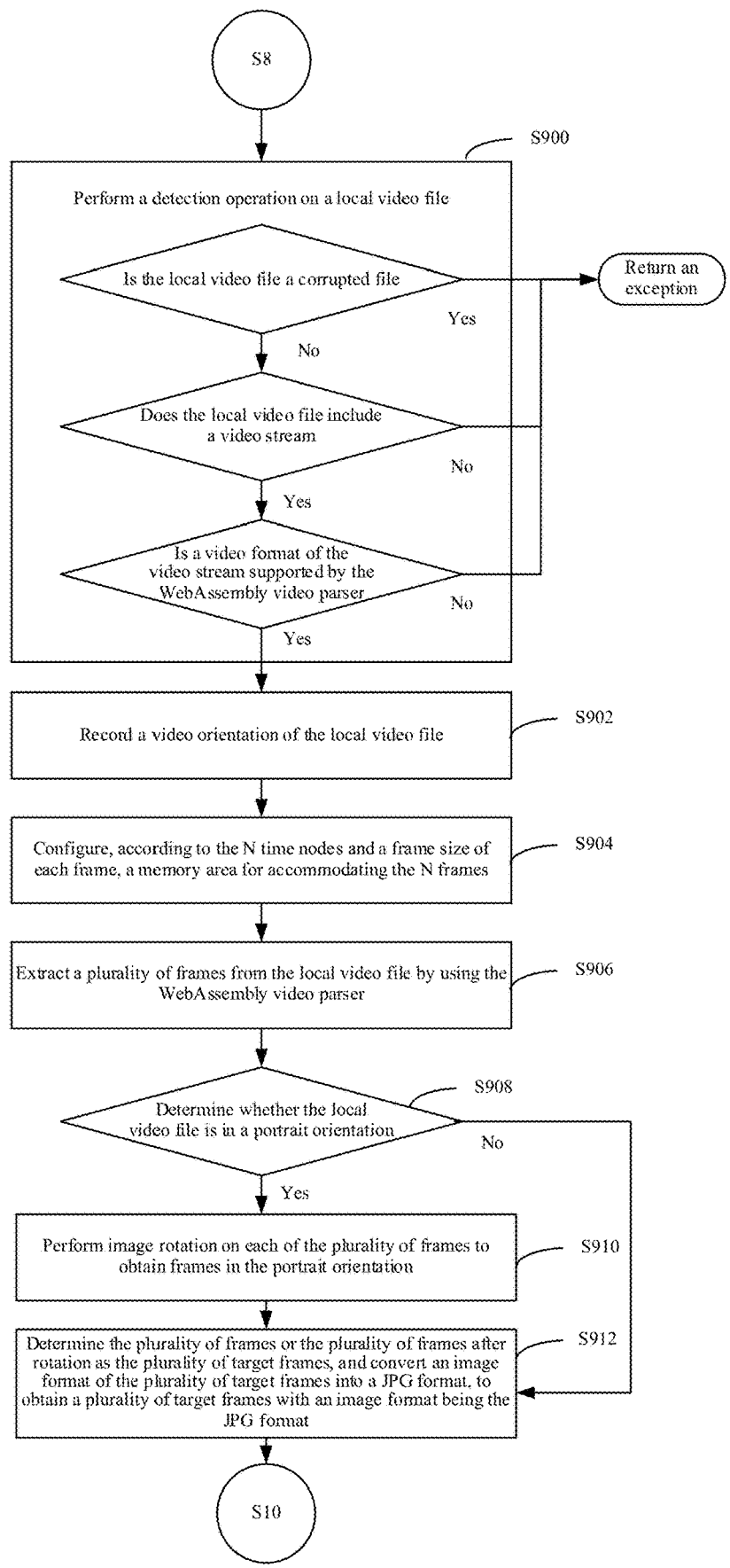
FIG. 9 is an exemplary schematic flowchart of step S9 in FIG. 10.

To make the present application clearer and more comprehensible, an exemplary procedure of step S9 in FIG. 8 is provided below. As shown in FIG. 9:

Step S900: Perform a detection operation on the local video file, and determine, according to a detection result, whether to extract the plurality of target frames from the local video file. The detection operation is used for detecting whether the local video file is a corrupted file, whether the local video file includes a video stream, and/or whether the WebAssembly video parser is capable of parsing the video stream. The benefit of this is to ensure the usability of the local video file.

Step S902: Record a video orientation (a landscape orientation or a portrait orientation) of the local video file.

Step S904: Configure, according to the N time nodes and a frame size of each frame, a memory area for accommodating the N frames. The benefit of this is that the size of memory required by the frame extraction thread can be dynamically adjusted, thereby avoiding a memory waste.

Step S906: Extract a plurality of frames from the local video file by using the WebAssembly video parser.

Step S908: Determine whether the local video file is in the portrait orientation. If the local video file is in the portrait orientation, the procedure proceeds to step S910. If the local video file is not in the portrait orientation, the procedure proceeds to step S912.

Step S910: Perform image rotation on each of the plurality of frames to obtain frames in the portrait orientation.

Step S912: Determine the plurality of frames or the plurality of frames after rotation as the plurality of target frames, and convert an image format of the plurality of target frames into a JPG format, to obtain a plurality of target frames with an image format being the JPG format.

Embodiment 3

Figure 10:
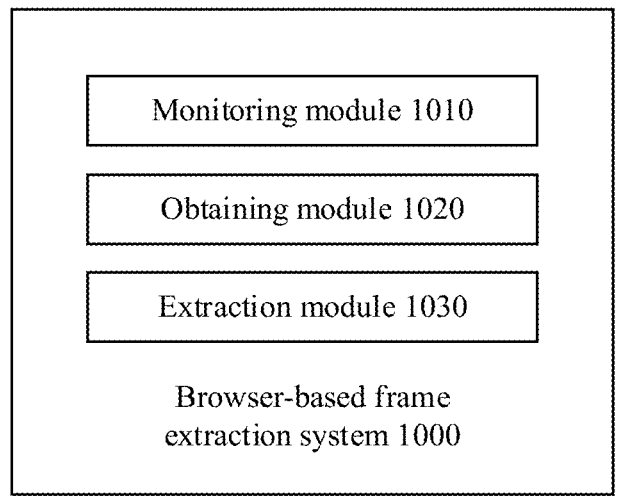
FIG. 10 is a schematic block diagram of a browser-based frame extraction system according to Embodiment 3 of the present application.

FIG. 10 is a schematic block diagram of a browser-based frame extraction system according to Embodiment 3 of the present application. The browser-based frame extraction system may be divided into one or more program modules. The one or more program modules are stored in a storage medium and executed by one or more processors to complete the embodiments of the present application. The program module in the embodiments of the present application refers to a series of computer-readable instruction segments capable of completing a specific function, and the following description specifically describes the function of each program module in this embodiment.

As shown in FIG. 10, the browser-based frame extraction system 1100 may include a monitoring module 1010, an obtaining module 1020, and an extraction module 1030.

The monitoring module 1010 is configured to monitor a target operation of a user on a target page of a browser.

The obtaining module 1020 is configured to obtain a local video file associated with the target operation.

The extraction module 1030 is configured to extract a plurality of target frames from the local video file by using a WebAssembly video parser in the browser.

Optionally, the extraction module 1030 is further configured to: determine, by using the WebAssembly video parser, whether the local video file is in a portrait orientation; extract a plurality of frames from the local video file by using the WebAssembly video parser; perform image rotation on each of the plurality of frames to obtain frames in the portrait orientation if the local video file is in the portrait orientation; and determine the frames in the portrait orientation as corresponding target frames.

In an exemplary embodiment, the extraction module 1030 is further configured to: obtain N frames corresponding to N time nodes, including: obtaining a key frame closest to a time node M, and determining the key frame as a frame corresponding to the time node M, where 1≤M≤N.

In an exemplary embodiment, the browser-based frame extraction system 1100 may further include a content distribution module (not labeled), configured to: configure, according to the N time nodes and a frame size of each frame, a memory area for accommodating the N frames.

In an exemplary embodiment, the browser-based frame extraction system 1100 may further include a thread enable module (not labeled), configured to: monitor whether the browser goes to the target page; and initialize a main thread and create a frame extraction thread in response to that the browser goes to the target page, the frame extraction thread being used for loading the WebAssembly video parser.

In an exemplary embodiment, the extraction module 1030 is further configured to: run the WebAssembly video parser by using the frame extraction thread to extract the plurality of target frames from the local video file; and transfer the plurality of target frames into the main thread for the main thread to perform a corresponding operation on the plurality of target frames.

In an exemplary embodiment, the browser-based frame extraction system 1100 may further include a detection module (not labeled), configured to: perform a detection operation on the local video file, and determine, according to a detection result, whether to extract the plurality of target frames from the local video file, where the detection operation is used for detecting whether the local video file is a corrupted file, whether the local video file includes a video stream, and/or whether a video format of the video stream is supported by the WebAssembly video parser.

Embodiment 4

Figure 11:
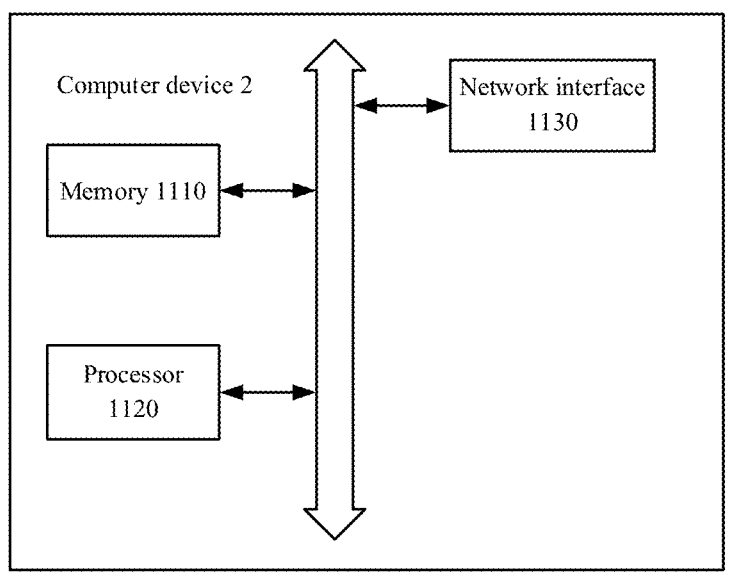
FIG. 11 is a schematic diagram of a hardware architecture of a computer device suitable for implementing a browser-based cover generation method according to Embodiment 4 of the present application.

FIG. 11 is a schematic diagram of a hardware architecture of a computer device 2 suitable for implementing a browser-based frame extraction method according to Embodiment 4 of the present application. In this embodiment, the computer device 2 is a device capable of automatically performing numerical calculations and/or information processing according to preset or stored instructions. For example, the computer device 2 may be a terminal device such as a smartphone, a tablet computer, a laptop computer, or a desktop computer. As shown in FIG. 11, the computer device 2 at least includes, but is not limited to, a memory 1110, a processor 1120, and a network interface 1130 that are communicatively connected by a system bus.

The memory 1110 includes at least one type of computer-readable storage medium. The readable storage medium includes a flash memory, a hard disk, a multimedia card, a card-type memory (for example, a secure digital (SD) memory or a DX memory), a random access memory (RAM), a static random access memory (SRAM), a read-only memory (ROM), an electrically erasable programmable read-only memory (EEPROM), a programmable read-only memory (PROM), a magnetic memory, a magnetic disk, an optical disc, and the like. In some embodiments, the memory 1110 may be an internal storage module of the computer device 2, for example, a hard disk or memory of the computer device 2. In some other embodiments, the memory 1110 may be an external storage device of the computer device 2, for example, a plug-in hard drive, a smart media card (SMC), an SD card, a flash card, or the like provided on the computer device 2. Certainly, the memory 1110 may include both an internal storage module of the computer device 2 and an external storage device of the computer device 2. In this embodiment, the memory 1110 is usually used for storing an operating system and various application software installed on the computer device 2, for example, program code for a browser-based frame extraction method. In addition, the memory 1110 may be used to temporarily store various types of data that have been outputted or are to be outputted.

In some embodiments, the processor 1120 may be a central processing unit (CPU), a controller, a microcontroller, a microprocessor, or another data processing chip.

The processor 1120 is usually used for controlling the overall operation of the computer device 2, for example, performing control and processing related to data interaction or communication with the computer device 2. In this embodiment, the processor 1120 is used for running the program code stored in the memory 1110 or processing data.

The network interface 1130 may include a wireless network interface or a wired network interface. The network interface 1130 is usually used for establishing a communication link between the computer device 2 and another computer device. For example, the network interface 1130 is used for connecting the computer device 2 to an external terminal through a network, to establish a data transmission channel, a communication link, and the like between the computer device 2 and the external terminal. The network may be an Intranet, the Internet, a Global System for Mobile communications (GSM), Wideband Code Division Multiple Access (WCDMA), a 4G network, a 5G network, Bluetooth, Wi-Fi, and other wireless or wired networks.

It needs to be noted that FIG. 11 shows only a computer device having components 1110 to 1130. However, it should be understood that it is not required to implement all the components shown, and more or fewer components may be implemented instead.

In this embodiment, the browser-based frame extraction method stored in the memory 1110 may be divided into one or more program modules and executed by one or more processors (in this embodiment, the processor 1120) to complete the embodiments of the present application.

Embodiment 5

The present application further provides a computer-readable storage medium. The computer-readable storage medium stores a computer-readable instruction. A processor is configured to execute the computer-readable instruction to implement the following steps:

monitoring a target operation of a user on a target page of a browser;

obtaining a local video file associated with the target operation; and extracting a plurality of target frames from the local video file by using a WebAssembly video parser in the browser.

In this embodiment, the readable storage medium includes a flash memory, a hard disk, a multimedia card, a card-type memory (for example, an SD memory or a DX memory), a RAM, an SRAM, a ROM, an EEPROM, a PROM, a magnetic memory, a magnetic disk, an optical disc, and the like. In some embodiments, the computer-readable storage medium may be an internal storage unit of the computer device, for example, a hard disk or memory of the computer device. In some other embodiments, the computer-readable storage medium may be an external storage device of the computer device, for example, a plug-in hard drive, an SMC, an SD card, a flash card, or the like provided on the computer device. Certainly, the computer-readable storage medium may include both an internal storage unit of the computer device and an external storage device of the computer device. In this embodiment, the computer-readable storage medium is usually used for storing an operating system and various application software installed on the computer device, for example, program code for a browser-based frame extraction method in the embodiments. In addition, the computer-readable storage medium may be used to temporarily store various types of data that have been outputted or are to be outputted.

Obviously, those skilled in the art should understand that the modules or steps in the embodiments of the present application described above may be implemented with a general-purpose computing device. The modules or steps may be centralized on a single computing device, or distributed on a network formed by a plurality of computing devices. Optionally, the modules or steps may be implemented with program code executable by a computing device. Therefore, the modules or steps may be stored in a storage device and performed by a computing device. In some cases, the steps shown or described may be performed in a different order than herein, or the steps may be implemented separately as individual integrated circuit modules, or a plurality of modules or steps thereof may be implemented as individual integrated circuit modules. In this way, the embodiments of the present application are not limited to any particular combination of hardware and software.

The above is only preferred embodiments of the present application and is not intended to limit the scope of the patent of the present application. Any equivalent structure or equivalent procedure transformation using the content of the specification of the present application and the accompanying drawings, or any direct or indirect application in other related technical fields, similarly falls within the scope of protection of the patent of the present application.

What is claimed is:

1. A method of extracting frames based on a browser, comprising:

monitoring whether the browser enters a target page among a plurality of web pages;

initializing a main thread and creating a frame extraction thread in response to determining that the browser enters the target page, the frame extraction thread configured to load a WebAssembly video parser in the browser;

monitoring a target operation of a user on the target page of the browser;

obtaining a local video file associated with the target operation;

extracting a plurality of target frames from the local video file using the WebAssembly video parser in the browser; and creating at least one picture from the extracted plurality of target frames, wherein the at least one picture is representative of the local video file.

2. The method according to claim 1, wherein the extracting a plurality of target frames from the local video file using a WebAssembly video parser in the browser further comprises:

determining whether the local video file is in a portrait orientation using the WebAssembly video parser;

extracting a plurality of frames from the local video file using the WebAssembly video parser;

performing image rotation on each of the plurality of frames to obtain frames in the portrait orientation in response to determining that the local video file is in the portrait orientation; and determining the plurality of frames in the portrait orientation as the plurality of target frames.

3. The method according to claim 2, wherein the extracting a plurality of frames from the local video file using the WebAssembly video parser comprises:

obtaining N frames corresponding to N time nodes, wherein the obtaining N frames corresponding to N time nodes further comprises:

obtaining a key frame closest to a time node M, and determining the key frame as a frame corresponding to the time node M, wherein 1≤M≤N.

4. The method according to claim 3, further comprising: configuring, according to the N time nodes and a frame size of each frame, a memory area for accommodating the N frames.

5. The method according to claim 1, further comprising: running the WebAssembly video parser by the frame extraction thread to extract the plurality of target frames from the local video file;
transferring the plurality of target frames into the main thread;
performing operations on the plurality of target frames by the main thread.

6. The method according to claim 1, further comprising: performing a detection operation on the local video file; and
determining, according to a detection result, whether to extract the plurality of target frames from the local video file, wherein the detection operation is configured to detect whether the local video file is a corrupted file, whether the local video file comprises a video stream, and whether a video format of the video stream is supported by the WebAssembly video parser.

7. A computer device, comprising a memory, a processor, and computer-readable instructions stored in the memory and executable by the processor, wherein the processor executes the computer-readable instructions to implement operations comprising:
monitoring whether a browser enters a target page among a plurality of web pages;
initializing a main thread and creating a frame extraction thread in response to determining that the browser enters the target page, the frame extraction thread configured to load a WebAssembly video parser in the browser;
monitoring a target operation of a user on the target page of the browser;
obtaining a local video file associated with the target operation;
extracting a plurality of target frames from the local video file using the WebAssembly video parser in the browser; and
creating at least one picture from the extracted plurality of target frames, wherein the at least one picture is representative of the local video file.

8. The computer device according to claim 7, wherein the extracting a plurality of target frames from the local video file using a Web Assembly video parser in the browser further comprises:
determining whether the local video file is in a portrait orientation using the WebAssembly video parser;
extracting a plurality of frames from the local video file using the WebAssembly video parser;
performing image rotation on each of the plurality of frames to obtain frames in the portrait orientation in response to determining that the local video file is in the portrait orientation; and
determining the plurality of frames in the portrait orientation as the plurality of target frames.

9. The computer device according to claim 8, wherein the extracting a plurality of frames from the local video file using the WebAssembly video parser comprises:
obtaining N frames corresponding to N time nodes, wherein the obtaining N frames corresponding to N time nodes further comprises:
obtaining a key frame closest to a time node M, and determining the key frame as a frame corresponding to the time node M, wherein 1≤M≤N.

10. The computer device according to claim 9, further comprising:
configuring, according to the N time nodes and a frame size of each frame, a memory area for accommodating the N frames.

11. The computer device according to claim 7, further comprising:
running the WebAssembly video parser by the frame extraction thread to extract the plurality of target frames from the local video file;
transferring the plurality of target frames into the main thread;
performing operations on the plurality of target frames by the main thread.

12. The computer device according to claim 7, further comprising:
performing a detection operation on the local video file; and
determining, according to a detection result, whether to extract the plurality of target frames from the local video file, wherein the detection operation is configured to detect whether the local video file is a corrupted file, whether the local video file comprises a video stream, and whether a video format of the video stream is supported by the WebAssembly video parser.

13. A non-transitory computer-readable storage medium, storing computer-readable instructions, wherein the computer-readable instructions are executable by at least one processor to cause the at least one processor to perform operations comprising:
monitoring whether a browser enters a target page among a plurality of web pages;
initializing a main thread and creating a frame extraction thread in response to determining that the browser enters the target page, the frame extraction thread configured to load a WebAssembly video parser in the browser;
monitoring a target operation of a user on the target page of the browser;
obtaining a local video file associated with the target operation;
extracting a plurality of target frames from the local video file using the WebAssembly video parser in the browser; and
creating at least one picture from the extracted plurality of target frames, wherein the at least one picture is representative of the local video file.

14. The non-transitory computer-readable storage medium according to claim 13, wherein the extracting a plurality of target frames from the local video file using a WebAssembly video parser in the browser further comprises:
determining whether the local video file is in a portrait orientation using the WebAssembly video parser;
extracting a plurality of frames from the local video file using the WebAssembly video parser;
performing image rotation on each of the plurality of frames to obtain frames in the portrait orientation in response to determining that the local video file is in the portrait orientation; and
determining the plurality of frames in the portrait orientation as the plurality of target frames.

15. The non-transitory computer-readable storage medium according to claim 14, wherein the extracting a plurality of frames from the local video file using the WebAssembly video parser comprises:
  obtaining N frames corresponding to N time nodes, wherein the obtaining N frames corresponding to N time nodes further comprises comprising:
    obtaining a key frame closest to a time node M, and
    determining the key frame as a frame corresponding to the time node M, wherein $1 \leq M \leq N$.

16. The non-transitory computer-readable storage medium according to claim 15, the operations further comprising:
  configuring, according to the N time nodes and a frame size of each frame, a memory area for accommodating the N frames.

17. The non-transitory computer-readable storage medium according to claim 13, the operations further comprising:
  running the Web Assembly video parser by the frame extraction thread to extract the plurality of target frames from the local video file;
  transferring the plurality of target frames into the main thread; and
  performing operations on the plurality of target frames by the main thread.

18. The non-transitory computer-readable storage medium according to claim 13, the operations further comprising:
  performing a detection operation on the local video file; and
  determining whether to extract the plurality of target frames from the local video file based on a detection result, wherein the detection operation is configured to detect whether the local video file is a corrupted file, whether the local video file comprises a video stream, and whether a video format of the video stream is supported by the WebAssembly video parser.

* * * * *